United States Patent
Enzo

[15] 3,664,005
[45] May 23, 1972

[54] DEVICE FOR FASTENING A HOOK TO A FISHING LINE

[72] Inventor: Ciatti Enzo, Via Starnina 48, Florence, Italy

[22] Filed: Mar. 13, 1970

[21] Appl. No.: 19,448

[52] U.S. Cl. .........................................29/211 D, 29/212 D
[51] Int. Cl. ..........................................................B23q 7/10
[58] Field of Search .............29/211 D, 212 D, 200 B, 203 H, 29/211, 212 R

[56] References Cited

UNITED STATES PATENTS 2,803,977  8/1957  Surratt.................................29/212 D
2,844,980  7/1958  Johnson..............................29/212 D Primary Examiner—Thomas H. Eager
Attorney—Watson, Cole, Grindle & Watson

[57] ABSTRACT

A turning device having an external appendix for seizing a fishing line is coaxially mounted to surround a hook stem which is supported on a feed supporting member inside a tube. Retractable pliers are mounted adjacent the turning device. The hook stem is placed in a binding position, the line is retained by gripping members, the pliers are extended in their support in an open position to receive the fishing line, and means are provided for rotating the turning device to wind the fishing line around the hook stem whereby the retraction of the pliers to close its jaw members firmly attaches the line to the hook stem. A cutting mechanism then severs the line.

5 Claims, 24 Drawing Figures

Patented May 23, 1972

INVENTOR,
CIATTI ENZO

BY Watson, Cole, Grindle & Watson
ATTORNEYS

Patented May 23, 1972
3,664,005
5 Sheets-Sheet 2
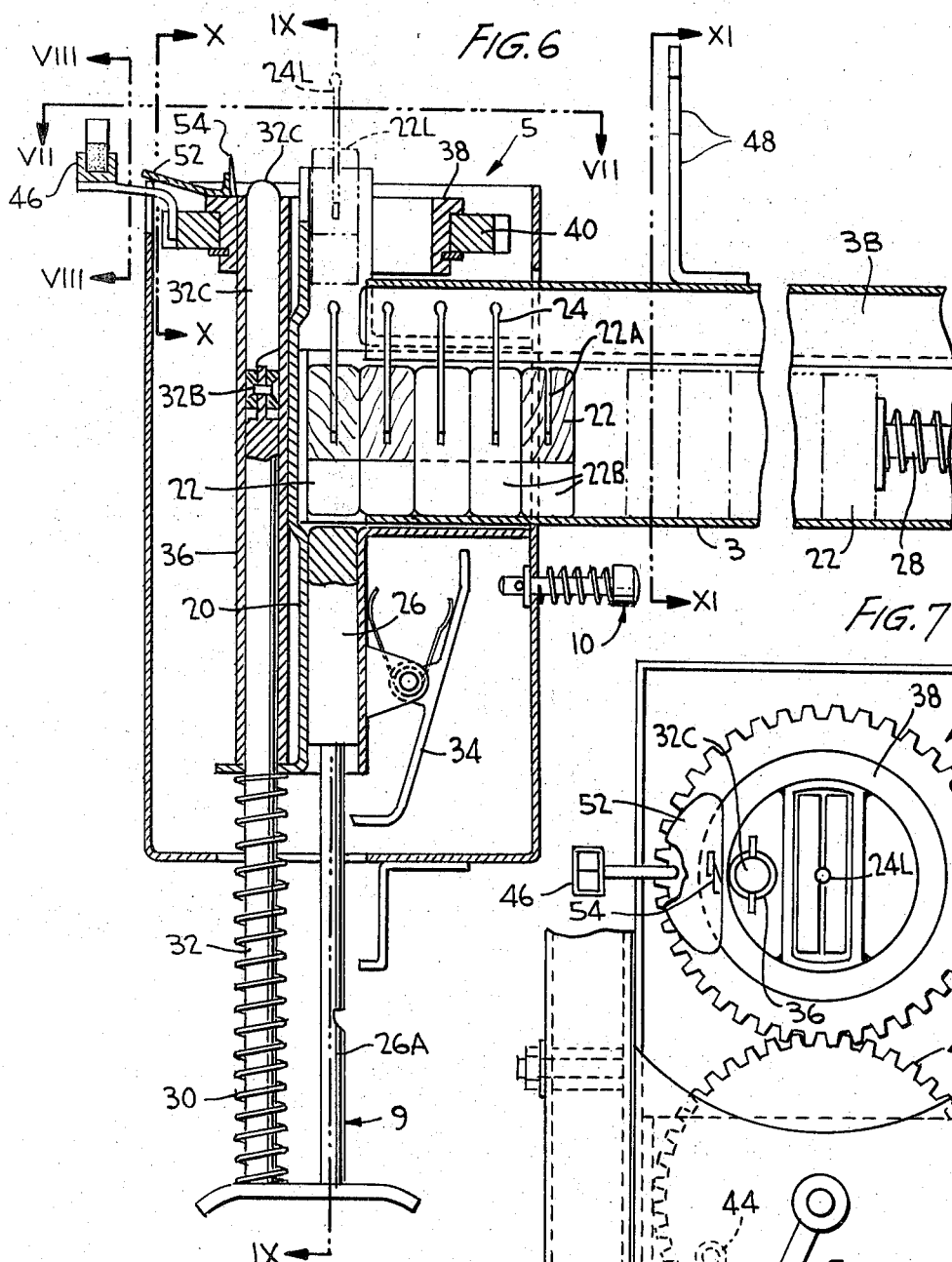
FIG. 6
FIG. 7
FIG. 8
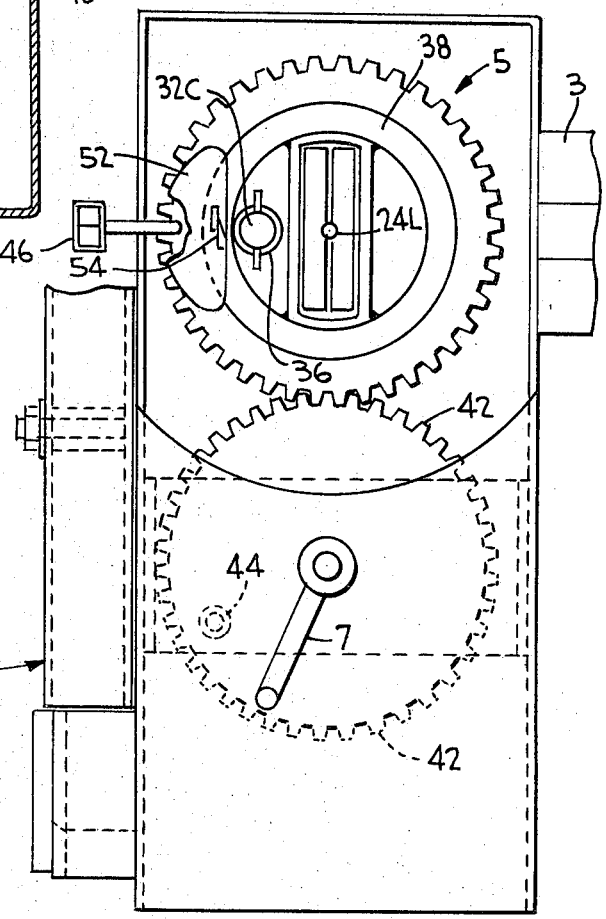
INVENTOR,
CIATTI ENZO
BY Watson, Cole, Grindle & Watson
ATTORNEYS

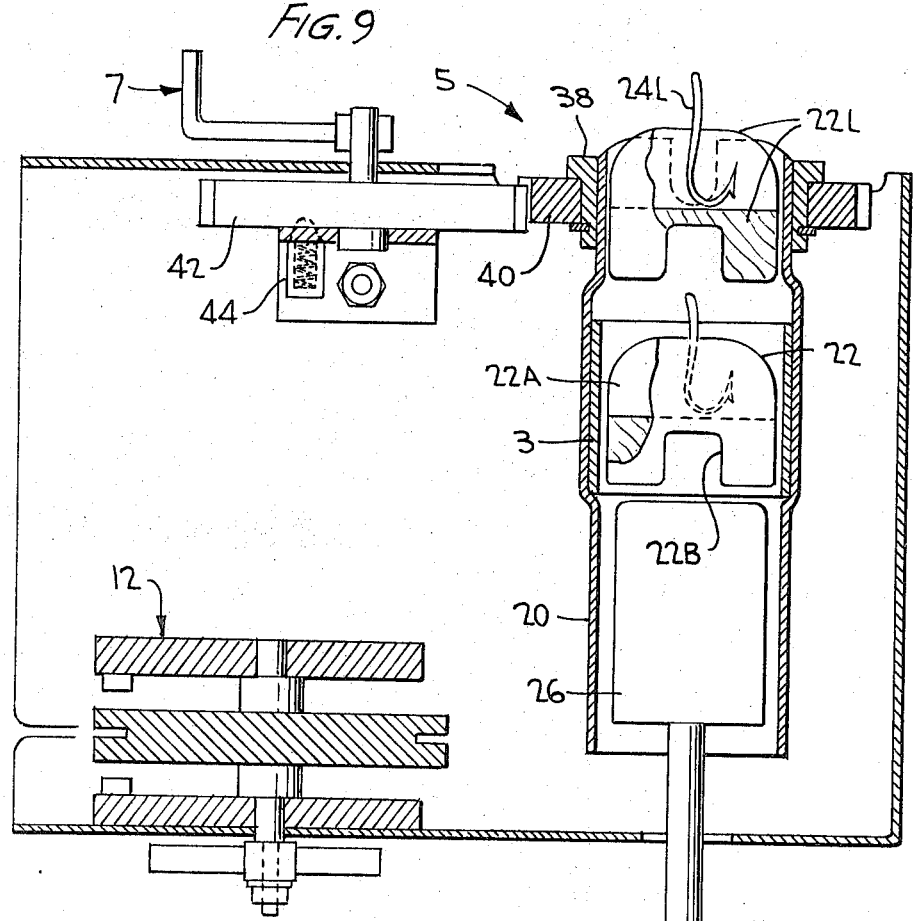
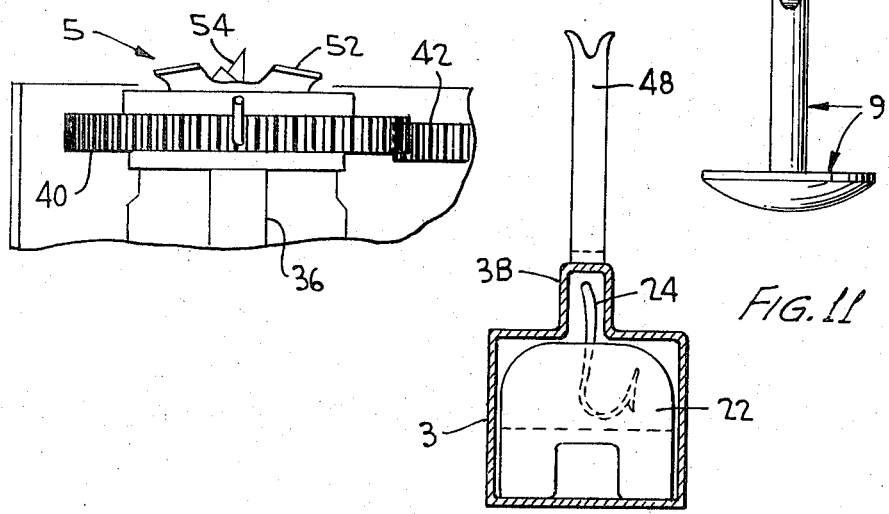

Patented May 23, 1972

INVENTOR,
CIATTI ENZO
BY Watson, Cole, Grindle & Watson
ATTORNEYS

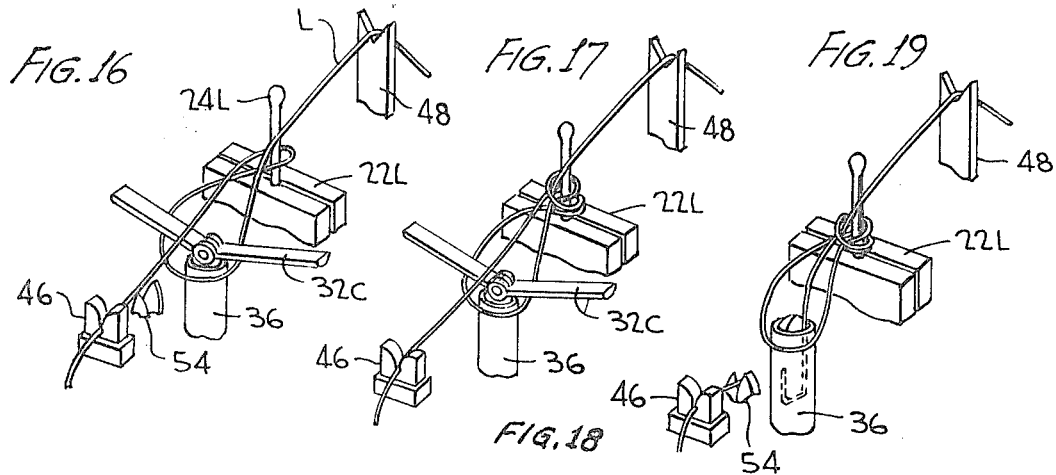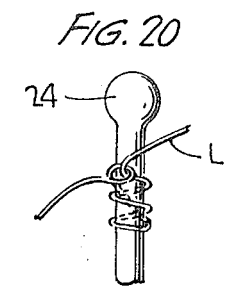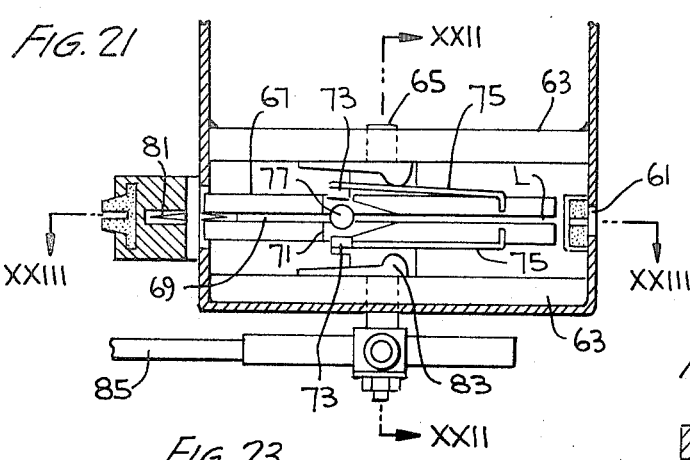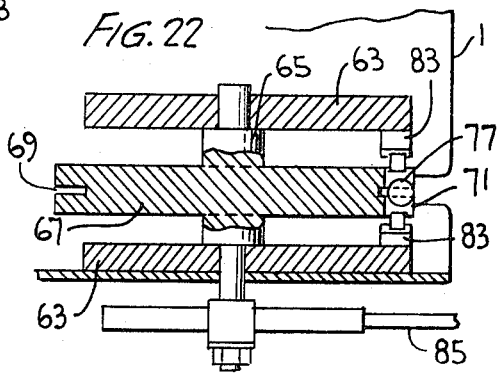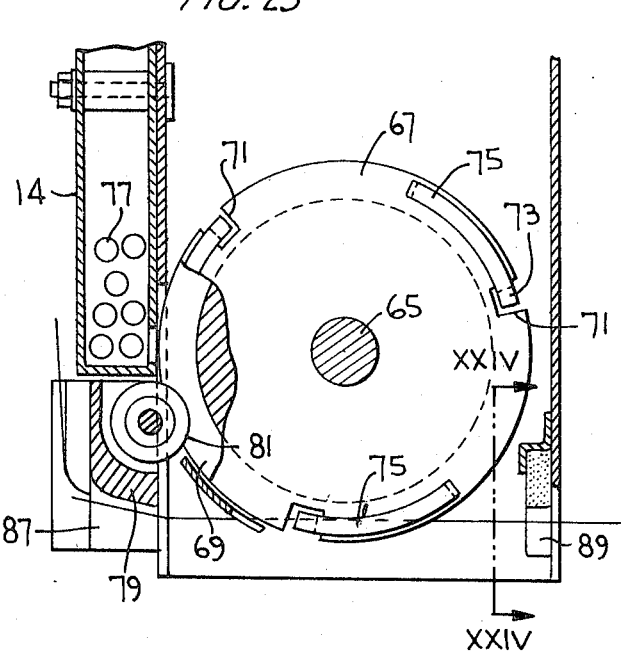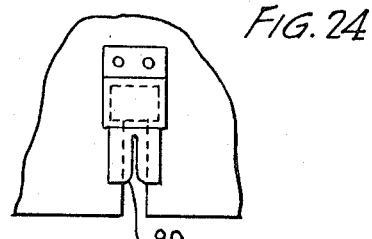

DEVICE FOR FASTENING A HOOK TO A FISHING LINE

The invention relates to devices for fastening a hook to a fishing line, to avoid hand-binding which may be difficult.

The inventive device comprises a pipe for feeding fish-hook supports and an ejector capable of presenting a hook and its support in a binding position. A round turning device with an external appendix to seize the fish-line and which spins around the stem of the hook which is in a binding position. Other devices make the turning device spin for one or more turns and stabilize it in a predetermined radial direction. Two retractile pliers are disposed between the support and the external appendix in a stabilized position which pliers slide parallelly to the rotation axis of the turning device between a position in which the jaws are spread apart and a position in which the jaws are closed. A supporting fork for the fish-line and a line cutter adjoining the pliers as well as ejector and pliers are provided controls.

A support is provided with a hook in a binding position and pliers with jaws spread apart. The fish line is placed onto a fork, under and outside the jaws of the pliers and then around the stem of the hook and at last fixed on the external appendix. Then, by the rotation of the turning device the line is bound around the stem of the hook for two or more turns. The spring lock of the pliers holds the line and it is cut while bound. The ejector and the pliers are operated by the same element which is controllable by a spring button so that it may reach the position for the expulsion of a support in a binding position and for the spreading of the pliers. In this position the element is held by a non-return cog and the spring causes, by a click action, the closing of the pliers and the return of the ejector.

The turning device, provided with a cog-wheel, is able to spin under the action of a side hand cog-wheel cooperating with an elastic peg which retains it. More hook supports may be contained in an extractible loader capable of bearing the fork. The apparatus may work with a device capable of fixing plummets to the fish line.

The drawing shows a an embodiment for carrying out the invention wherein:

FIG. 1: shows a front view of the device combined with a plummet fixing device.

FIG. 6 shows a cross section of a loading device and the axis of the turning device through line VI—VI of FIG. 1.

FIGS. 7, 8, 9, 10, 11 show respective sections through lines VII—VII, VIII—VIII, IX—IX, X—X, XI—XI of FIG. 6.

FIGS. 16 to 19 show various phases of operation of the hook binding mechanism.

FIG. 20 shows the hook extremity attached to a fish-line.

FIG. 21 shows in section a detail in the same direction as in FIG. 2.

Figure 4:
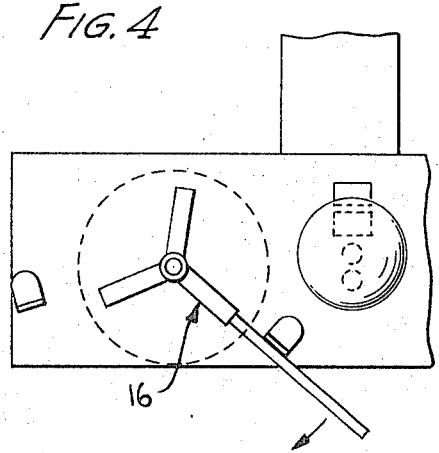
FIG. 4, 5 show views respectively through lines IV—IV of FIG. 1 and V—V of FIG. 2.
Figure 5:
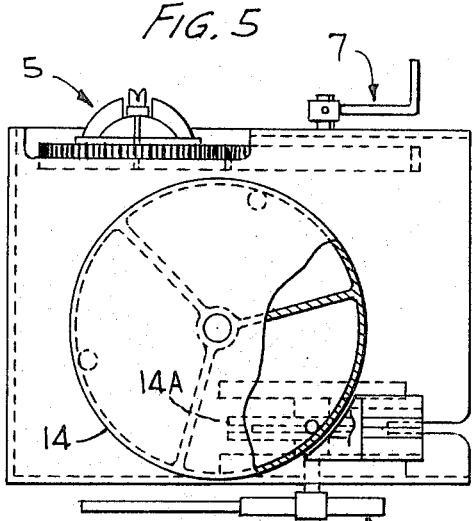
Figure 1:
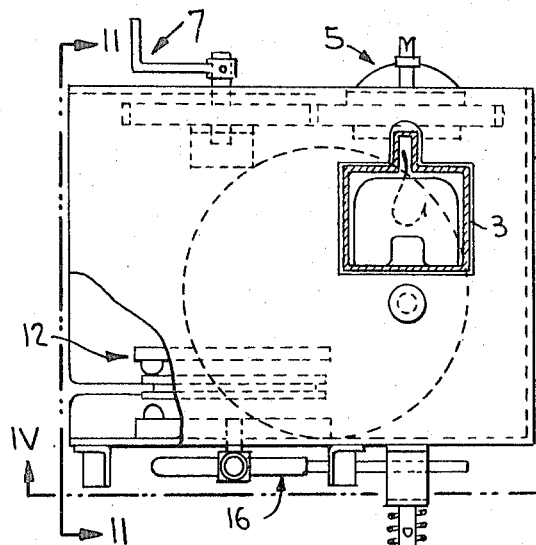
Figure 2:
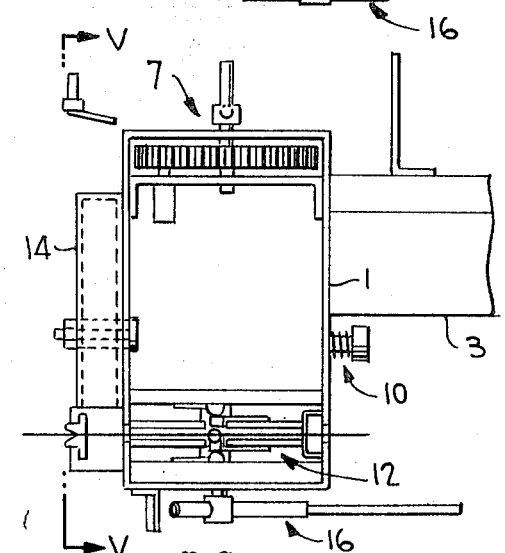
FIG. 2 shows a view along line II—II of FIG. 1.
Figure 3:
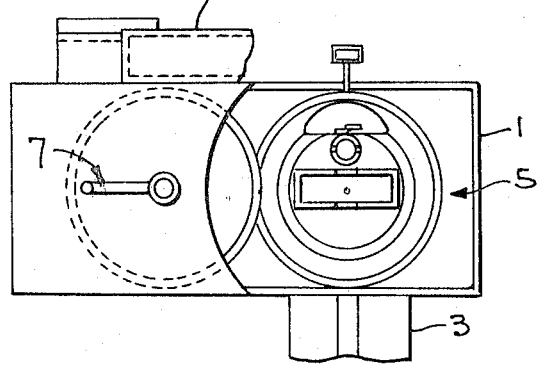
FIG. 3 shows the plan view relative to FIG. 1.
Figure 12:
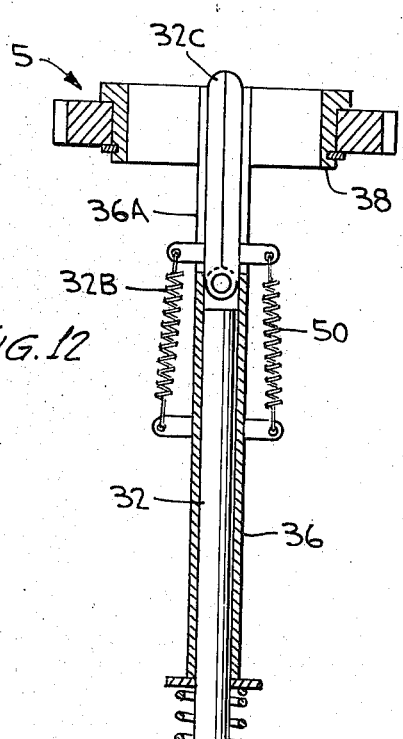
FIGS. 12, 13 show two isolated positions of a pliers device.

FIGS. 22, 23, 24 respectively show a section along line XXII—XXII of FIG. 21, a section along line XXIII—XXIII FIG. 21, and detail view along line XXIV—XXIV of FIG. 23.

In a general way, the apparatus illustrated in FIGS. 1 to 5 has two devices for two different functions, and in particular the hook binding device, which is the object of this invention, and a plummet fixing device.

1 indicates the container of the device.

3 indicates a loading mechanism containing the hooks carried by respective binding supports.

5 indicates a device for binding the line to the hook.

7 indicates a hand-wheel to control the device 5 and 9 indicates a button for the insertion of a hook.

10 indicates a button which frees the hook ejector formed by button 9.

12 indicates a plummet insertion device.

14 indicates the plummet container.

16 indicates the control for the plummet insertion device.

The hook-line binding device may be, as shown in FIGS. 1 to 5, combined to the plummet fixing device or may be unattached to such a device.

With reference to FIGS. 9 to 20, 20 indicates a space inside the container 1, reached by loader 3 having extremity 3A (see FIGS. 6 to 14).

The space 20 extends upwardly to make room for support 22L which is part of a group of supports 22 mounted in the loader 3 and which have to be fed successively to position 22L to bind the hook 24, placed in each support 22 in an easily detachable way. 24L indicates the hook in a binding position on support 22L.

Hooks 24 may be inserted in notches 22L of supports 22, and the extremity of the hook stem juts from the relative supports, and the loader is in alignment with a proper channel 3B (see FIG. 11) Supports 22 each includes a hollow portion 22 B, to avoid any interferences with the hook-stem of a successive support.

An ejecting element 26 having stem 26A is part of button 9, slides in the housing 20. The ejecting element 26 acts on support 22 in the loader 3 to carry it into the position 22L.

A spring biased bottom member 28 (FIG. 6) pushes residual supports 22 against wall 3A, after the return of ejecting element 26, 26A of button 9 from a low position; this position is obtained by a spring 30 wound around a stem 32 which slides parallel to ejecting element 26, 26A, in one direction by the action of spring 30 and in the opposite direction by operation of a hand button 9. The ejecting element 26, 26A may be held, and the stem 32 with it, in the up position shown in FIGS. 13, 14, under the action of a cog 34 acting on a notch of the stem 26A, and movable to free to itself for example, from the knob 10 as shown in FIG. 6.

The stem 32 glides in its proper seat formed by a sleeve 36, which flanks the housing 20, and ends at the side of the determined position by the housing for the support 22 L in its binding position. The sleeve 36 and particularly the housing 20 are joined to a flanged hole 38, which is part of the binding device.

Cogged turning device 40 is mounted within flanged hole 38 and is rotatable therein. The turning device engages a wheel moved by handle 7.

An elastic peg 44 (FIG. 9) determines a particular position of the device 42 and of the turning device 40, which may be assumed many times during the operation of the apparatus.

The turning device 40 has an external gripper 46 to seize the fish-line, which, in the position determined by peg 44 is on the side of the sleeve 36; and in radial alignment from the seat in a diametrally opposite position from support 22L and from hook 24L of fish-line guide 48 which is carried by loader 3. The fork 48 might be replaced by pliers.

Figure 13:
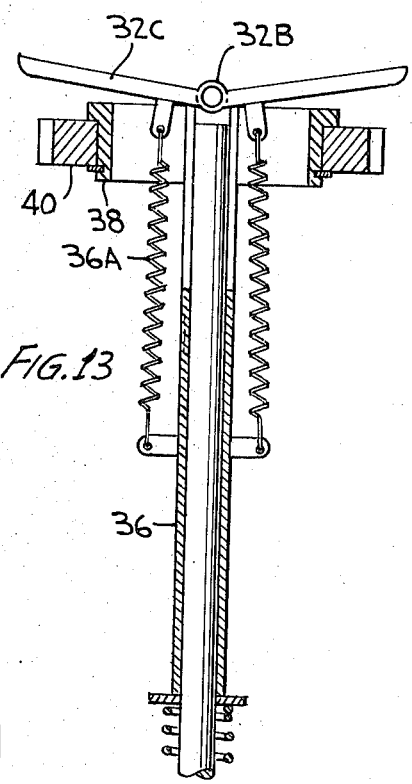
Figure 14:
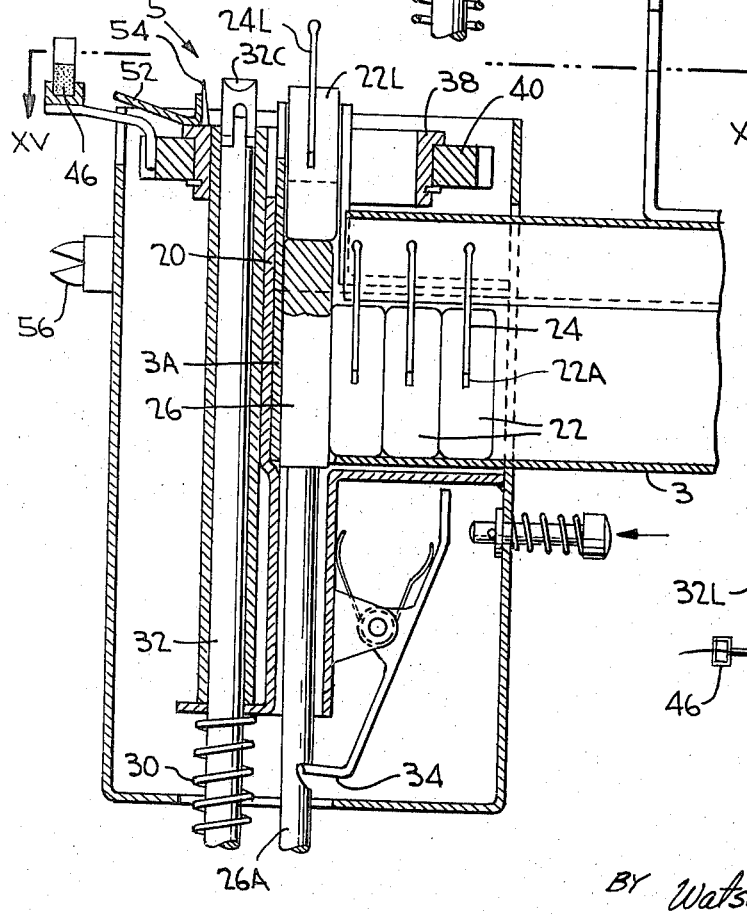
FIG. 14 shows a view similar to FIG. 6 in a different position of the visible mobile parts.
Figure 15:
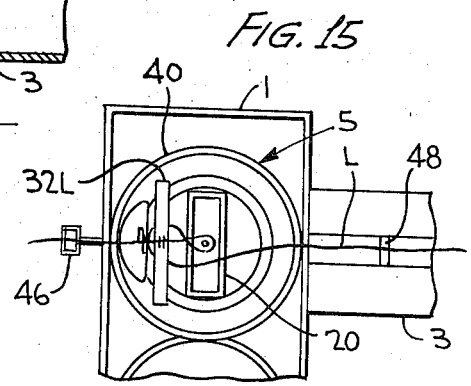
FIG. 15 shows a schematic view along the line XV—XV of FIG. 14.

At its top extremity, the sleeve 36 is bifurcated longitudinally (see FIGS. 12 and 13), and the stem 32 carries at 32B two jaws 32C which may be inserted in a closed position into the sleeve 36 and may be opened wide apart when the stem 32 is lifted in the position shown in FIGS. 13 and 14. The opening thereof is obtained by a spring 50 fixed to jaws 32C by flanges thereon. The hole 38 is formed as indicated at 52 in FIG. 7 to provide for a seizing of the line by a blade 54. The external shape 52 and the blade 54 are between the jaws 32C and external gripper 46.

The button 9 moves a support in position 22L, by the action of spring 30 and after the pushing of the support 22L into its binding position which is maintained by the cog 34.

In this position the stem 32 is in the position indicated in FIG. 13 with jaws 32C open wide apart.

The position of the line L rests (see FIGS. 15 and 16) on the fork 48, then under one jaw 32C, then around the sleeve 36 and under the other jaw 32C, then around the stem of the hook 24L and finally within gripper 46 that holds the line. The line may be severed by a pair of shears (see FIG. 14) mounted on body 1 adjacent the rest position of the turning device 40 and the gripper 46.

Between the hook 24L and the gripper 46 the line is just above the blade 54.

When the line is in the above mentioned position, and has been cut by the blades 54, the turning device 40 is rotated by handle 7, so that the gripper 46 moves in direction contra to that of the line. Windings are made, by the turning device, around the hook stem, and accordingly the gripper 46 travels in circular trajectories around the hook stem, under the line segment between the fork 48 and the hook, and over the jaws 32C of the pliers.

The gripper 46 stops in the starting position.

Then, the line is carried either on the fork 48 or on the gripper 46 to tighten it in the position shown FIG. 17.

Then the apparatus is ready to cut and make a knot in the line. For this operation, the stem 26A is freed by lifting the cog 34.

The spring 30 releases the ejector 26 and the stem 32 travels downwardly which movement causes the rapid closing of the jaws 32C and the retention of the line between the hook segment and the gripper 46. The line is returned into the sleeve 36 which causes the knotting of the line on the hook stem 24L. The line then is cut by the blade 54 adjacent to the jaws 32C.

The length of the cut line may be altered by a further cutting of the line.

By pulling down the ejector 26, the pushing device 28 positions another support 22. This is accomplished by pushing button 9, whereby support 22L is ejected with a tied hook and another support 22 takes position 22L.

The articulated joint 32B moves upwards and opens jaws 32C over the extremity of sleeve 36 and the cog 34 holds the apparatus in the new position corresponding to the starting position. The following description relates to a device for fixing plummets to the fish-line which may work together with the above-described device for fastening a hook to a fish-line.

With reference to FIGS. 21, 22, 23, 24 a shaft 65 is mounted to housing, by supports 63 and carries a disc-like element 67. This element 67 has a hollow portion 69 around its entire circumference. Different sized radial segments 71 are positioned about the periphery of disc 67 in accordance with the size of the spherical plummets to be fixed to the line.

Every segment 71 partially interferes with the hollow 69 and is defined laterally by two jaws 73 carried by corresponding elastic sheets 75 which maintain the jaws 73 open to receive a plummet 77.

The plummets 77 are contained in holder 14 which may be subdivided into more circular sectors to accommodate different size plummets 77.

Every circular sector 14 has an opening 14A (see FIG. 23) from which a plummet can be fed to a segment 71 when disc element 67 is moved angularly to present that segment to the opening. The container 14 can be moved to present either of the openings 14A to the sector containing different size plummets.

Adjoining the feeding position of an opening 14A, a disc blade 81, mounted on a support 79, partly penetrates into the hollow 69 and adjoining the position of the blade 81 and opposite the feed opening 14A, the supports 63 have opposing cam profiles 83, which can act on the jaws 73 and on the sheets 75. The disc element 67 may be moved by a lever 85 acting on the shaft 65 alternately for a determinate angle around its axis. The width of the angle made by the element 67 and lever 85 is limited by two stops (not shown) acting against the lever 85.

On housing 1 are placed two line guides 87 and 89, in which a line L may be inserted so that the line segment L between the two line guides 87 and 89 is partly in the hollow 69.

Moving the disc element 67 between one and the other of its limit positions, one of the seats 71 is connected with an opening 14A, so that a spherical plummet 77 may fall in the seat 71 between the two jaws 73, opened by sheets 75. Continuing its angular movement, the plummet in seat 71 is partially cut by the blade 81.

In the cut made by the blade 81 is inserted the line segment L which is between the two line guides 87 and 89.

During the rotative movement and when the line is inserted into the cut made by the blade 81 in the plummet 77, the profiles 83 act on the jaws 73 so that the plummet is squeezed and the cut is closed.

The plummet is now attached to the line and the same operation can be repeated with another plummet.

By moving the container 14 so that it presents another opening to segment 71 the size of the plummet may be changed.

A similar segment 71 is able to fix different plummets having a relatively limited size. In order to move element 67 in a position able to use a different segment 71, it is sufficient to take out the lever 85 from a segment on the shaft 65 and insert it in a different segment.

The foregoing specification and drawings are meant only to illustrate a preferred embodiment of the invention and those skilled in the art will recognize other modifications and variations within the scope of the appended claims.

What I desire to protect by Letters Patent is:

1. A device for tying a hook to a line, comprising:
a tube for feeding supports, including an ejector for presenting a hook with its support in a binding position,
a ring-like turning device including an external appendix to seize the line and coaxially placed and rotatable around the hook stem in said binding position;
means for rotating said turning device for one or more turns and to stabilize it in a predetermined position,
retractable pliers placed between said support in binding position, said pliers gliding parallelly to the rotation axis of said turning device between a position in which the jaws of said pliers are spread apart and a position in which they are closed,
means for receiving the line,
a line cutting member mounted adjacent to said pliers,
means for controlling said pliers,
whereby by rotating said turning device the line winds around the hook stem and the closing of said pliers by said control means attaches the line to said hook stem and is severed.

2. A device as in claim 1 wherein said means for controlling said pliers includes a spring button for inserting said ejector in a position for ejecting a support in said binding position and for spreading apart said pliers, said pliers and ejector are held by the same element, said means for controlling further including a cog and a spring for closing said pliers and for returning said ejector to its former position, said spring is activated by said cog.

3. A device as set forth in claim 1 further comprising a cog wheel, means for driving said cog wheel, and an elastic peg for stopping said driving means, wherein said turning device includes a cogged ring rotated by said cog wheel.

4. A device as set forth in claim 1 further comprising extractable loader means including a plurality of support members carrying a number of hooks, said loader means carrying said means for receiving.

5. A device as in claim 4 wherein each of said support members includes an aperture for holding the hook shanks whereby hooks are fed to said device.

* * * * *